June 28, 1932.  N. O. FLEMING  1,864,898

DUAL ELEMENT COOLING TOWER

Filed March 1, 1930    3 Sheets-Sheet 1

INVENTOR:
Norman O. Fleming.
BY
ATTORNEY

June 28, 1932. N. O. FLEMING 1,864,898

DUAL ELEMENT COOLING TOWER

Filed March 1, 1930 3 Sheets-Sheet 2

INVENTOR:
Norman O. Fleming,
BY
ATTORNEY.

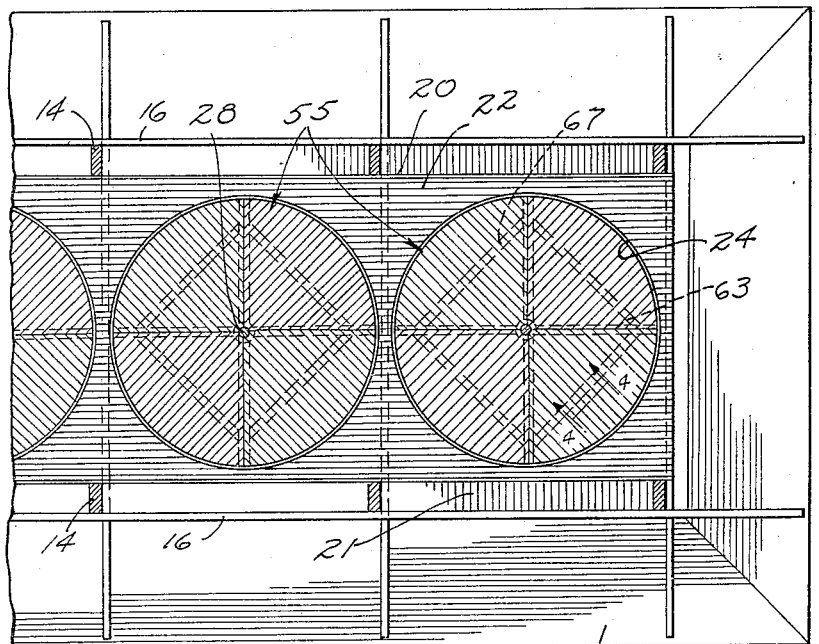
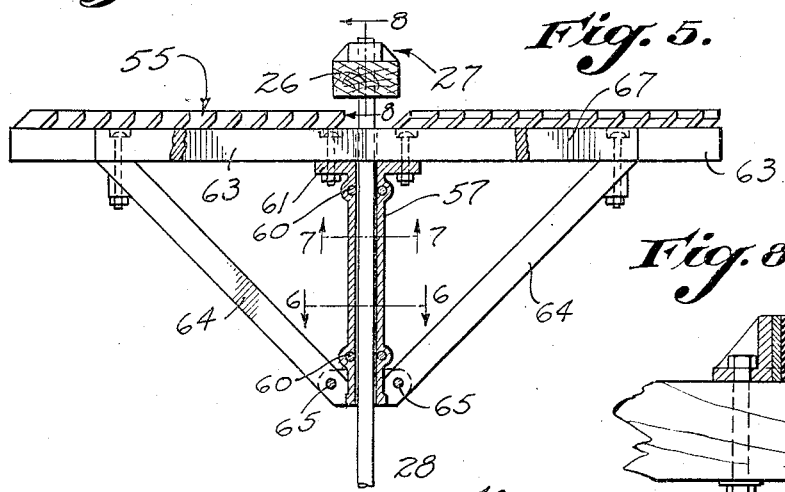

Patented June 28, 1932

1,864,898

UNITED STATES PATENT OFFICE

NORMAN O. FLEMING, OF PASADENA, CALIFORNIA

DUAL ELEMENT COOLING TOWER

Application filed March 1, 1930. Serial No. 432,523.

In my co-pending application entitled "Cooling tower", filed November 28, 1927, Serial No. 236,173, I disclose a rotor positioned in a vertical cooling space and rotated by the dropping thereon of water droplets introduced into the top of this space. The present invention relates to a multi-unit cooling tower and to certain novel constructional details.

It is an object of this invention to provide a cooling tower having two or more rotors positioned in adjacent cooling spaces, adjacent rotors preferably rotated in opposite directions.

Another object of the invention is to provide a novel attaching means for securing one or more rotor elements to a shaft.

Still a further object of the invention is to provide a novel bearing construction for a cooling tower shaft, the upper bearing being preferably water lubricated and the lower bearing being protected from water.

Another object of the invention is to provide a novel construction for a rotor element including, among other features, blades of novel shape and a novel spacing means for these blades.

Further objects and advantages of the invention will be made evident hereinafter.

Referring to the drawings,—

Fig. 3 is a sectional view taken on the line 3—3 of Fig. 1.

Fig. 5 is an enlarged sectional view of one of the rotor elements of my invention.

Fig. 6 is a sectional view taken on the line 6—6 of Fig. 5.

Fig. 7 is a sectional view of a split hub taken on the line 7—7 of Fig. 5.

Fig. 8 is a sectional view taken on the line 8—8 of Fig. 5.

In its preferred form, my invention is mounted on a base 10, there being a pan construction 11 positioned thereon providing a ledge 12 therearound.

Figure 1:
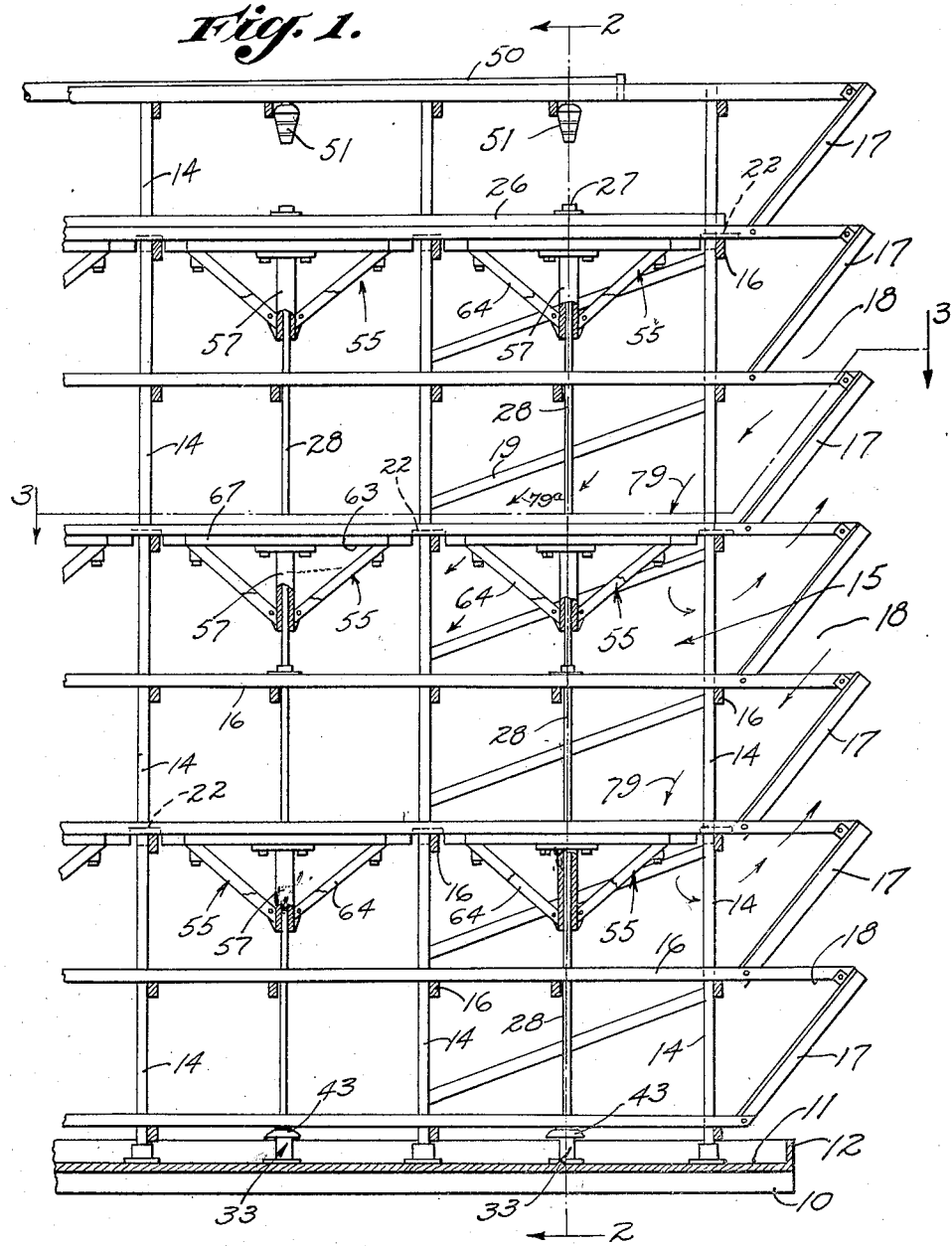
Fig. 1 is a side view, partially in section, of the cooling tower of my invention.
Figure 2:
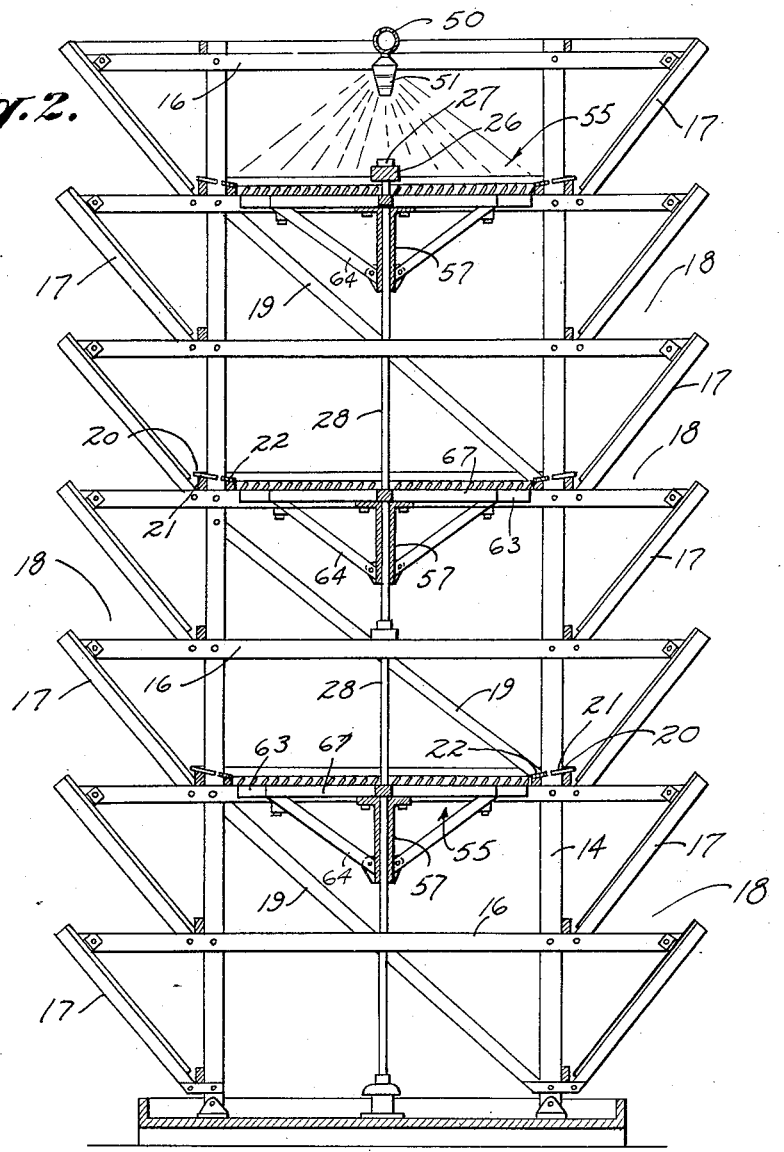
Fig. 2 is a sectional view taken on the line 2—2 of Fig. 1.

Posts 14 extend upward, as indicated in Figs. 1 and 2, the space between any four adjacent posts defining a cooling space 15. Secured to the posts 14 are horizontal cross members 16, the ends of these members extending beyond the end posts 14 in a manner to retain a plurality of louvres 17 secured thereto and inclined downward, as indicated in Figs. 1 and 2. These louvres define channels 18 therebetween which communicate between the cooling spaces 15 and the atmosphere.

In the present invention, I prefer to provide a number of cooling spaces 15 side-by-side in a single row, although several of these rows may be placed side-by-side if desired. I have found, however, that a superior cooling action takes place if only a single row of these cooling spaces is utilized. In this event, the end cooling space is surrounded on three sides by louvres, the intermediate cooling spaces being provided with louvres on two sides thereof, the other two sides being in open communication with the adjacent cooling spaces. It will be noticed that the cross members 16 extend both longitudinally and transversely of the cooling tower to give a rigid construction thereof. The rigidity of this structure is increased by braces 19, such as shown in Fig. 1.

Spaced at intervals throughout each cooling space 15 are decks 20, as best shown in Figs. 2 and 3. These decks are preferably formed of interspaced slats, and comprise a longitudinal deck section 21 extending throughout the length of the cooling tower and sloping downward toward the center thereof, and a surrounding deck structure 22 formed of longitudinally extending slats and sloping toward the center of the cooling space. These decks are preferably supported on alternate cross members 16, and the slats thereof may be grooved, as disclosed in my co-pending application, for the purpose of directing any water dropping thereon toward a circular opening 24 formed in each surrounding deck structure 22.

Extending transversely above the vertical axis of each cooling space 15 is a member 26 adapted to support a bearing structure 27 in which a vertical shaft 28 is journaled. The bearing structure 27 is preferably formed of a collar 29 surrounding a water-lubricated bearing 30, this bearing being preferably formed of rubber and enclosed by a sleeve 31 fitting in the collar 29.

Figure 9:
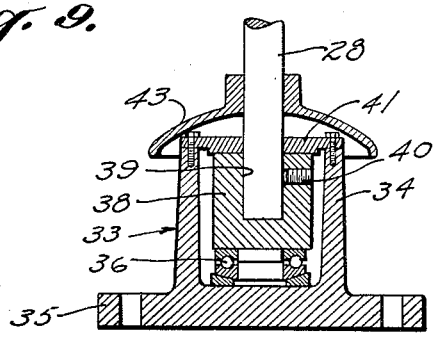
Fig. 9 is a sectional view of the lower bearing of my invention.

The lower end of the shaft 28 is journalled in a thrust bearing structure 33 which comprises a bearing cup 34 secured to the pan construction 11 by bolts passing through a flange 35. Positioned in the cup 34 is a self-centering thrust bearing 36, this bearing being preferably of the ball type, as best shown in Fig. 9.

A shaft-retaining member 38 rests on the upper race of the bearing 36 and has an opening 39 in which the lower end of the shaft 28 rests, the shaft being retained in this opening by means of a set screw 40. A plate 41 loosely surrounds the shaft 28 and covers the top of the cup 34, this cup being filled with a suitable lubricating medium. To prevent the entrance of water into this thrust bearing, I provide a water shield 43 secured to the shaft 28 above the thrust bearing structure 33 and extending outward over the cup 34. This water shield deflects therearound any water falling thereon and thus prevents any entrance of water into this cup.

Water is sprayed or otherwise introduced into the upper end of each cooling space through a pipe 50, the preferred embodiment of my invention utilizing nozzles 51 for breaking up the water into droplets which drop downward through the cooling space and into the pan construction 11. When the level of this water reaches the upper edge of the ledge 12 water flows thereover and into a suitable drain. It will be noticed that the water shields 43 are positioned above the maximum upper level of the water in the pan construction 11 as is also the upper edge of the cup 34. Thus, the water level can never reach the water shield 43 and can thus not reach the bearing surfaces of the thrust bearing 36.

During the downward movement of the drops of water in the cooling space 15, these drops come into contact with an upper rotor element 55 positioned in the opening 24 of the uppermost deck 20. This rotor element is so formed that the drops of water impinging thereon cause a rotation of the shaft 28. From the uppermost rotor element 55 the water drops to the next lower rotor element, also positioned in the opening 24 of the next lower deck 20. Here again the water imparts a rotary motion to the rotor element which is transferred to the shaft 28. Any number of these elements may be placed one above the other, but in the form illustrated I have shown but three of these elements.

Figure 4:
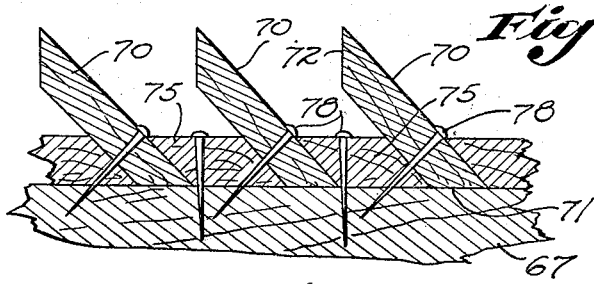
Fig. 4 is a view taken on the line 4—4 of Fig. 3.

Each of the rotor elements 55 are similarly constructed and the details thereof are best illustrated in Figs. 4 to 6 inclusive. Referring to these figures, a split hub structure 57 surrounds the shaft, this structure being preferably formed of two sleeve members 58 having V-shaped notches 59 therein, the walls of which are adapted to engage the peripehry of the shaft 28 when the sleeve members are clamped together as by bolts 60. Such a split hub construction forms a very secure attachment between the rotor element and the shaft and facilitates the removal and replacement of these elements.

Secured to a flange 61 formed at the upper end of the hub structure 57 are spokes 63 extending radially from the shaft 28. Struts 64 extend diagonally downward in supporting relationship with these spokes and are secured to the lower end of the hub structure 57 as by bolts 65.

Extending between adjacent spokes 63 are braces 67, the upper surface of these braces being in the same plane as the upper surface of the spokes 63.

The space between adjacent spokes 63 is occupied by parallel blades 70, these blades being preferably formed of trapezoidal cross-section, as best shown in Fig. 4, so as to be inclined upward. The inner ends of these blades are suitably secured to the spokes 63, while the outer ends thereof extend beyond the braces 67 and terminate a short distance from the walls of the opening 24. As best shown in Fig. 4, each of these blades is placed so that a surface 71 thereof engages the brace 67 thereadjacent, and the shape of the blades 70 is so designed that a face 72 thereof is substantially vertical. The blades 70 are spaced apart by spacing elements 75 which are shaped in the form of a parallelogram. The size of the spacing elements 75 is so regulated that the vertical face 72 of one of the blades 70 lies immediately above the extreme edge of an adjacent blade 70. Furthermore, the upper edge of each blade is rather sharp so that there is no possibility of a drop of water passing through the rotor element without exerting a torque thereon. The blade 70 and spacing elements 75 are preferably secured to the braces 67 by brass nails 78, as best shown in Fig. 4.

Regardless of whether or not the water being cooled is used for driving the rotor elements, the blades 70 of these elements tend to set up a downward flow of air therebetween. This air enters the cooling space 15 through the channel 18 immediately thereabove and is expelled from this space after coming into cooling relationship with the water through the channel 18 therebelow. This flow of air is indicated by arrows 79 of Fig. 1 and causes a very efficient cooling of the water in the cooling space 15. It should also be apparent that the downward current of air passing through any particular rotor element tends to set up an upward flow of air through the horizontally adjacent rotor element rotating in the adjacent cooling space 15, as indicated by arrows 79a.

I have found it preferable to incline the blade 70 on horizontally adjacent rotor elements in opposite directions so that the rotor elements in one cooling space rotate opposite to those in the adjacent cooling space. This not only gives a superior cooling action, but also damps out any vibrations which might be set up in the framework of the cooling tower and subjects this framework to smaller stresses than would otherwise be the case.

I claim as my invention:

1. In a cooling tower, the combination of: means defining a plurality of vertical cooling spaces, said cooling spaces being in open communication with each other; a shaft extending upward through each cooling space; a thrust bearing at the lower end of each shaft and engaging therewith in supporting relationship; a radial bearing for journalling the upper end of each shaft; a rotor element mounted on each shaft; and means for introducing water to be cooled into the upper portion of said cooling spaces, said water impinging on said rotor elements to rotate said shaft.

2. In a cooling tower, the combination of: means defining a plurality of vertical cooling spaces, said cooling spaces being in open communication with each other; a shaft extending upward through each cooling space; a thrust bearing at the lower end of each shaft and engaging therewith in supporting relationship; a radial bearing for journalling the upper end of each shaft; a rotor element mounted on each shaft; means for introducing water to be cooled into the upper portion of said cooling spaces, said water impinging on said rotor elements to rotate said shafts; and a water shield mounted on each shaft just above said thrust bearing.

3. In a cooling tower, the combination of: means defining a plurality of vertical cooling spaces, said cooling spaces being in open communication with each other; a shaft extending upward through each cooling space; a thrust bearing at the lower end of each shaft and engaging therewith in supporting relationship; a radial bearing for journalling the upper end of each shaft; a rotor element mounted on each of said shafts; means for introducing water to be cooled into the upper portion of said cooling spaces, said water impinging on said rotor element to rotate each of said shafts; a water shield mounted on said shaft just above said thrust bearing; and drain means preventing the water level in the lower end of said cooling space from rising sufficiently to enter said thrust bearings.

4. In a cooling tower, the combination of: a rotor element rotatably mounted in a cooling space; a second rotor element rotatably mounted in a second cooling space, said cooling spaces being in open communication with each other, said rotor elements being provided with blades, the blades of said rotor element being inclined oppositely to corresponding blades of said second rotor element; and water-introducing means for supplying water to the top of said cooling spaces, said water impinging on said blades in dropping through said cooling spaces to rotate said rotor elements in opposite directions.

In testimony whereof, I have hereunto set my hand at Los Angeles, California, this 25th day of February, 1930.

NORMAN O. FLEMING.

CERTIFICATE OF CORRECTION.

Patent No. 1,864,898. June 28, 1932.

NORMAN O. FLEMING.

It is hereby certified that error appears in the printed specification of the above numbered patent requiring correction as follows: Page 3, line 59, claim 3, for "said" first occurrence, read each; and that the said Letters Patent should be read with this correction therein that the same may conform to the record of the case in the Patent Office.

Signed and sealed this 18th day of October, A. D. 1932.

(Seal)

M. J. Moore,
Acting Commissioner of Patents.